(12) United States Patent
Wada

(10) Patent No.: US 10,304,195 B2
(45) Date of Patent: May 28, 2019

(54) INFORMATION PROCESSING APPARATUS, COMPUTER-READABLE STORAGE MEDIUM, AND INFORMATION PROCESSING METHOD FOR JUDGING A RECOGNITION TARGET AREA

(71) Applicant: CANON KABUSHIKI KAISHA, Tokyo (JP)

(72) Inventor: Katsuhiro Wada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 15/448,175

(22) Filed: Mar. 2, 2017

(65) Prior Publication Data

US 2017/0263000 A1 Sep. 14, 2017

(30) Foreign Application Priority Data

Mar. 9, 2016 (JP) ................................. 2016-045471

(51) Int. Cl.
  *G06K 9/46* (2006.01)
  *G06T 7/13* (2017.01)
  *G06T 7/60* (2017.01)
(52) U.S. Cl.
  CPC .............. *G06T 7/13* (2017.01); *G06K 9/4604* (2013.01); *G06T 7/60* (2013.01)

(58) Field of Classification Search
  None
  See application file for complete search history.

(56) References Cited

U.S. PATENT DOCUMENTS

| 2007/0172122 | A1 | 7/2007 | Kouno | |
| 2012/0263394 | A1* | 10/2012 | Fujiwara | H04N 1/387 382/266 |
| 2015/0003666 | A1* | 1/2015 | Wang | G06K 9/00463 382/100 |
| 2015/0347860 | A1* | 12/2015 | Meier | G06K 9/72 382/140 |
| 2016/0125613 | A1* | 5/2016 | Shustorovich | G06K 9/00463 382/140 |

* cited by examiner

*Primary Examiner* — Justin P. Misleh
(74) *Attorney, Agent, or Firm* — Canon U.S.A., Inc. IP Division

(57) ABSTRACT

An information processing apparatus detects a line segment from an image, determines whether four sides of a plate are detected based on the detected line segment, calculates an aspect ratio of the detected four sides in a case where it is determined that four sides of the plate are detected, and determines whether the aspect ratio satisfies a first condition. In a case where it is determined that four sides of the plate are not detected, the information processing apparatus searches a vicinity of the detected line segment for an object, and determines whether the object satisfies a second condition. The information processing apparatus judges that a recognition target area is included in the image in a case where it is determined that the first condition or the second condition is satisfied.

6 Claims, 11 Drawing Sheets

FIG. 10

| id | CLASSIFICATION | RECOGNITION TARGET ASPECT RATIO | LANDSCAPE RECOGNITION TARGET AREA RATIO | PORTRAIT RECOGNITION TARGET AREA RATIO |
|---|---|---|---|---|
| 1 | CHARACTER PLATE 1 | 1 : 6 | 1 : 5.84 | 0.917 : 6 |
| 2 | CHARACTER PLATE 2 | 1 : 10 | 1 : 9.73 | 0.889 : 10 |
| 3 | CHARACTER PLATE 3 | 9 : 16 | 9 : 15.50 | 8.5 : 16 |

| id | CLASSIFICATION | RECOGNITION TARGET ASPECT RATIO | INPUT IMAGE | RECOGNITION TARGET IMAGE | minX | maxX | minY | maxY |
|---|---|---|---|---|---|---|---|---|
| 1 | CHARACTER PLATE 1 | 1 : 6 | 1080×1920 | 300×1800 | 50 | 1750 | 25 | 275 |
| 2 | CHARACTER PLATE 2 | 1 : 10 | 1080×1920 | 180×1800 | 50 | 1750 | 20 | 160 |
| 3 | CHARACTER PLATE 3 | 9 : 16 | 1080×1920 | 900×1600 | 50 | 1550 | 50 | 850 |

| id | CLASSIFICATION | OBJECT TYPE | OBJECT FORMAT |
|---|---|---|---|
| 1 | CHARACTER PLATE 1 | CHARACTER STRING | [A-Z][A-Z]¥d[2][A-Z]¥d[4] |
| 2 | CHARACTER PLATE 2 | CHARACTER STRING | [A-Z][A-Z]¥d[2][A-Z]¥d[4] |
| 3 | CHARACTER PLATE 3 | IMAGE | id3.jpeg |

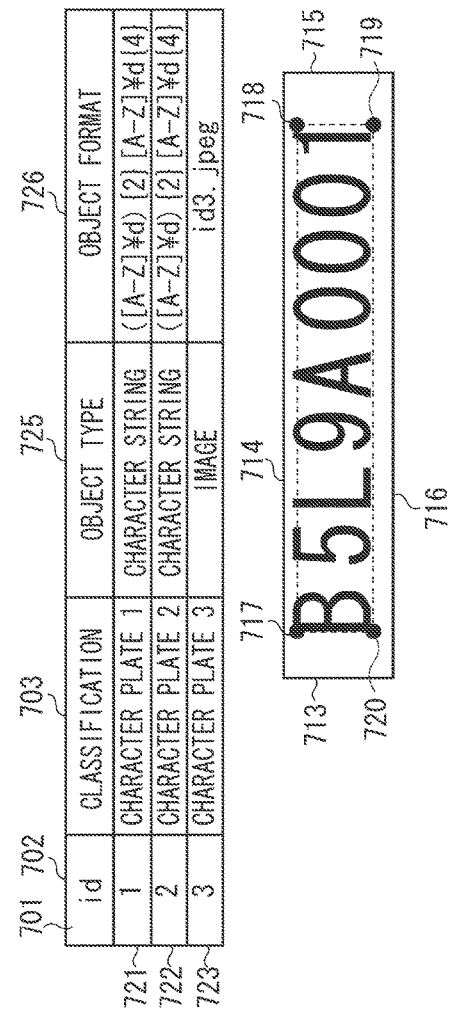

INFORMATION PROCESSING APPARATUS, COMPUTER-READABLE STORAGE MEDIUM, AND INFORMATION PROCESSING METHOD FOR JUDGING A RECOGNITION TARGET AREA

BACKGROUND OF THE INVENTION

Field of the Invention

The present invention relates to an information processing apparatus capable of determining whether a recognition target area is included in an image.

Description of the Related Art

US Patent Application Publication No. 2007/0172122 A1 (US 2007/0172122) discusses a technique for detecting marker images having a predetermined shape (e.g. marker images having a cross shape) from within an image captured by a camera and judging whether a recognition target area is included in the captured image with its position or size satisfying a desirable condition based on the detected marker images.

However, in the technique of US 2007/0172122, the marker images have to be included in the captured image. Accordingly, the information processing apparatus of US 2007/0172122 cannot automatically determine whether the recognition target area is included in the captured image in a case where distinctive marker images are not included in the captured image.

SUMMARY OF THE INVENTION

According to an aspect of the present invention, an information processing apparatus includes a memory that stores a program of instructions, and includes at least one processor in communication with the memory. By executing the program of instructions, the at least one processor performs various processing. In particular, the at least one processor performs detecting a line segment from an image, determining whether four sides of a plate are detected based on the detected line segment, calculating an aspect ratio of the detected four sides in a case where it is determined that four sides of the plate are detected, and determining whether the calculated aspect ratio satisfies a first condition. In a case where it is determined that four sides of the plate are not detected, the at least one processor further performs searching a vicinity of the detected line segment for an object, and determining whether the object satisfies a second condition. The at least one processor further performs judging that a recognition target area is included in the image in a case where it is determined that the aspect ratio satisfies the first condition or it is determined that the object satisfies the second object.

Further features of the present invention will become apparent from the following description of example embodiments with reference to the attached drawings.

BRIEF DESCRIPTION OF THE DRAWINGS

FIG. 10 is a diagram illustrating an example of an object information management table managed by the mobile application.

DESCRIPTION OF THE EMBODIMENTS

In a case where an image of a plate including a character string which is a character recognition target is to be captured, an information processing apparatus can determine that a recognition target area within the plate is included in the captured image if the information processing apparatus can recognize that the entire plate is completely captured. However, if the plate has a color similar to its background color, it is difficult for a prior art to precisely detect an edge of the plate, and thus the area of the plate is not always completely identified.

A mobile terminal will now be described as an example of an information processing apparatus according to a present example embodiment of the present invention. The mobile terminal can communicate with an external device by using a wireless communication function.

Figure 1:
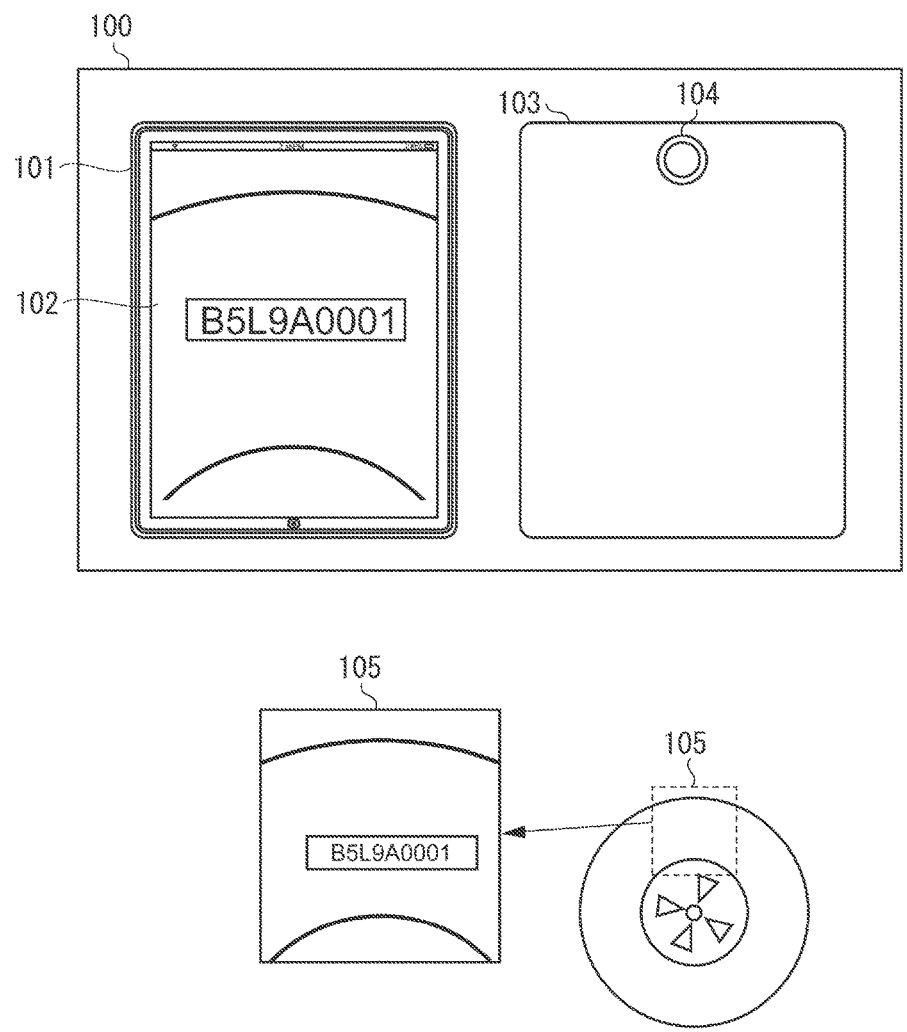
FIG. 1 is a diagram illustrating an example of an external view of a mobile terminal.

FIG. 1 is a diagram illustrating an external view of a front face portion 101 and a rear face portion 103 of a mobile terminal 100 and a tire as an object 105. The front face portion 101 of the mobile terminal 100 includes a touch panel display 102 having two functions, i.e., a display function and a touch operation input function. The rear face portion 103 of the mobile terminal 100 includes a camera unit 104 for capturing and taking an image of the object 105. In the present example embodiment, a user of the mobile terminal 100 can capture the image of the object 105 and perform character recognition processing by using a mobile application (details will be described below) to be executed by a central processing unit (CPU) of the mobile terminal 100. In the present example embodiment, an operation for capturing an image of characters engraved on a character plate on a side face of a tire will be described as the object 105, as an example. The object 105 is not limited to the tire, but may be an object of another type such as a metallic plate, a document, a photograph, or a whiteboard. Furthermore, the characters are not limited to the engraved characters, but may be printed or hand-written characters. A mobile application described below can take in an image of the object 105 and output the image thereof to the touch panel display 102.

Figure 2:
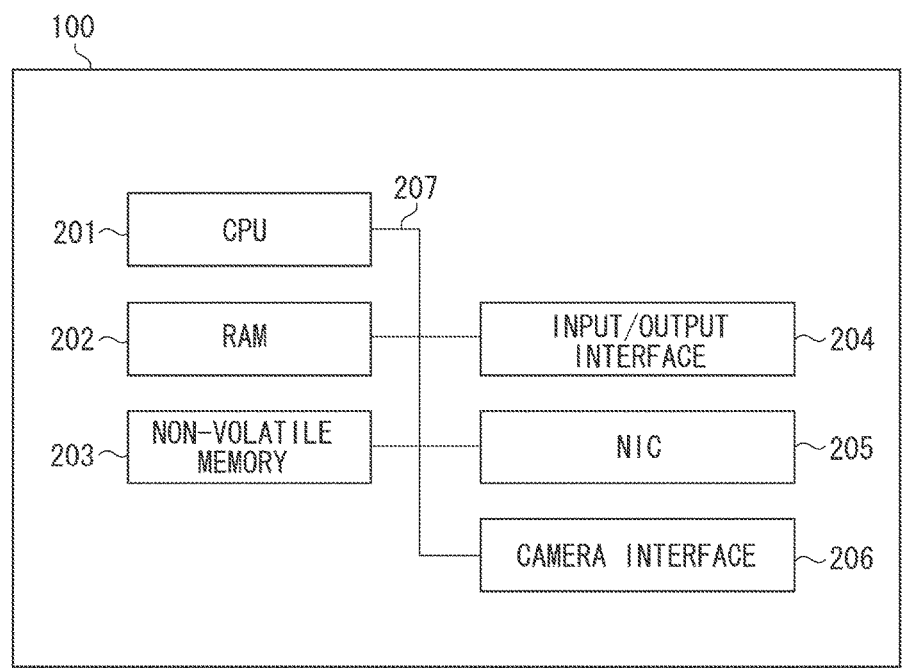
FIG. 2 is a block diagram illustrating a hardware configuration of the mobile terminal.

FIG. 2 is a block diagram illustrating an example of a hardware configuration of the mobile terminal 100. A CPU 201 is a processing unit that realizes various functions by executing various programs. A random access memory (RAM) 202 is a unit for storing various types of information or serving as a temporary work/storage area of the CPU 201. A non-volatile memory (e.g., read only memory (ROM)) 203 is a unit for storing various programs or various types of data. The CPU 201 loads a program stored in the non-volatile memory 203 to the RAM 202 and executes the program. In other words, by executing the program, the CPU (i.e., computer) 201 of the mobile terminal 100 functions as respective processing units described in FIG. 3 to execute steps of a below-described sequence. In addition, the nonvolatile memory 203 may be a flash memory, a hard disk drive (HDD), or a solid state disk (SSD). Further, all or a part of the functions of the mobile terminal 100 or processing relating to the below-described sequence may be realized by using dedicated hardware. An input/output interface 204 transmits and receives data to/from the touch panel display 102. A network interface card (NIC) 205 is a unit for connecting the mobile terminal 100 to a network (not illustrated). A camera interface 206 connects to the camera unit 104 and takes in the image of the object 105 into the mobile terminal 100. The above-described units can transmit and receive data via a bus 207.

Figure 3:
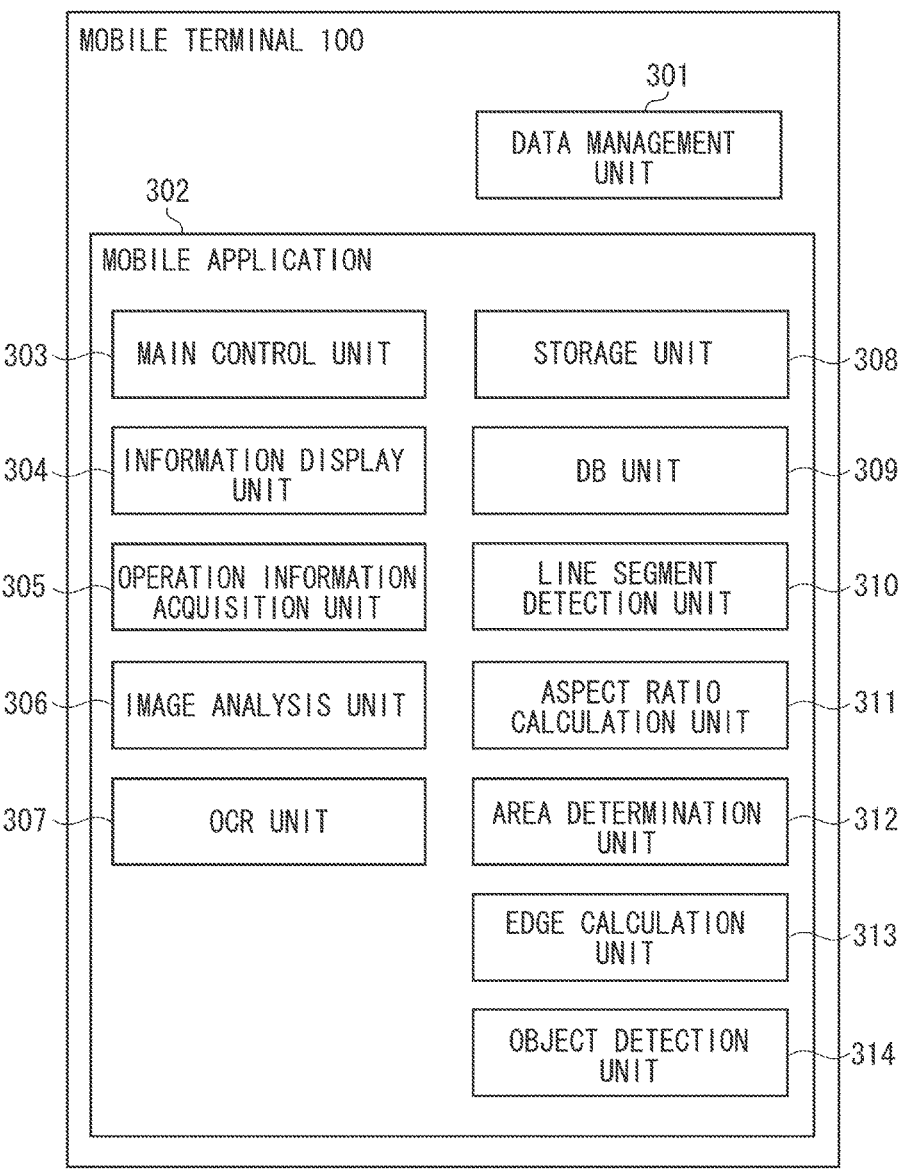
FIG. 3 is a block diagram illustrating a software configuration of the mobile terminal.

Next, a software configuration of the mobile terminal 100 will be described. FIG. 3 is a conceptual diagram illustrating an example of the software configuration of the mobile terminal 100. The CPU 201 of the mobile terminal 100 functions as respective processing units (respective processing modules) 303 to 308 by executing a mobile application (mobile terminal application program) 302. Further, an operating system (OS) (not illustrated) of the mobile terminal 100 functions as a data management unit 301.

The data management unit 301 manages images and application data. The OS provides a control application programming interface (API) for using the data management unit 301. Each application implements acquisition processing or storing processing of images or application data with respect to the data management unit 301 by using the control API.

The mobile application 302 can be executed when a user downloads and installs the mobile application 302 by using an install function of the OS of the mobile terminal 100. The mobile application 302 executes various types of data processing with respect to the image of the object 105 taken via the camera interface 206.

A main control unit 303 provides instructions and manages each module unit 304 to 314 described below.

Figure 4:
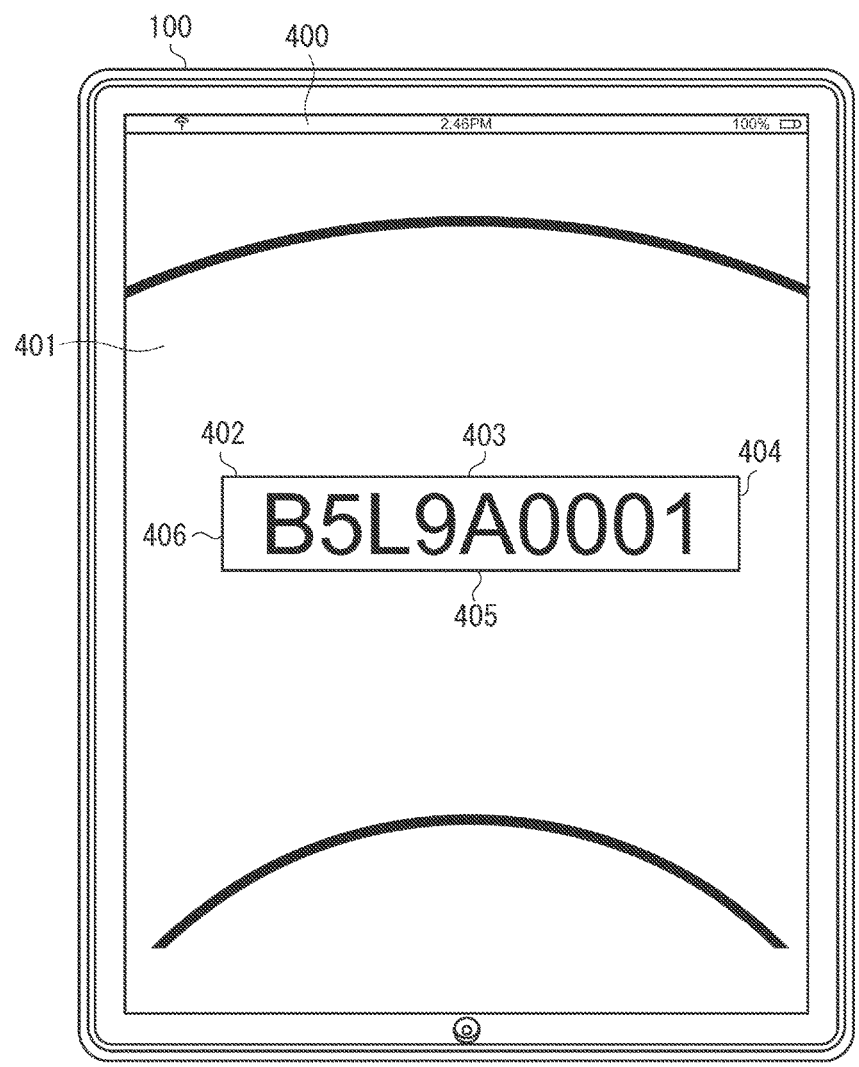
FIG. 4 is a diagram illustrating an example of a user interface (UI) of a mobile application.

According to an instruction from the main control unit 303, an information display unit 304 controls the touch panel display 102 to display a user interface (UI) of the mobile application 302 as illustrated in FIG. 4.

FIG. 4 is a diagram illustrating an example of a screen (mobile terminal screen 400) for providing a UI (mobile terminal UI) of the mobile application 302. The mobile terminal screen 400 is displayed on the touch panel display 102 of the mobile terminal 100. An image taken with the camera unit 104 is displayed on a display/operation area 401 of the mobile terminal screen 400, and an operation performed by the user (i.e., user operation) on the image is received via the UI displayed thereon. In the example of the screen illustrated in FIG. 4, a character plate 402 on a tire which is the object 105 is captured and displayed.

A line segment detection unit 310 described below analyzes a camera input image acquired with the camera unit 104 and the camera interface 206, and executes straight line detection processing of the character plate 402 on the tire. When four sides of the character plate 402 are detected, a closed area is formed by an upper edge 403, a right edge 404, a lower edge 405, and a left edge 406. However, depending on a light source condition or imaging capability of the camera unit 104, it is difficult to precisely detect the edges of four sides of the character plate 402 if a target object is a black character plate 402 provided on a black tire, and thus there is a case where the closed area indicating a plate area cannot be extracted.

A configuration (i.e., a position, a size, an area, layout, or display content) of the UI of the mobile application 302 is not limited to the configuration illustrated in FIG. 4. Any configuration suitable for realizing the functions of the mobile terminal 100 can be employed.

An operation information acquisition unit 305 acquires information relating to the user operation executed on the UI of the mobile application 302 and notifies the main control unit 303 of the acquired information. For example, when the user touches the display/operation area 401 with the hand, the operation information acquisition unit 305 detects position information of the touched screen and transmits the detected position information to the main control unit 303.

An image analysis unit 306 executes edge detection processing and optical character recognition (OCR) processing to analyze a camera input image acquired with the camera unit 104 and the camera interface 206, and extracts a character string on the character plate 402 of the object 105. For this purpose, the image analysis unit 306 controls respective modules 307 to 314. Further, in addition to a function for simply capturing a still image, the camera unit 104 also includes a moving image capturing function or a continuous image capturing function for acquiring still images at high speed.

An OCR unit 307 executes the OCR processing on a recognition target area extracted by the image analysis unit 306.

A storage unit 308 stores a setting value input by a user through the operation information acquisition unit 305 (i.e., the UI of the mobile application 302).

A database (DB) unit 309 has a database function and manages the information of various types such as an identification (id), a classification, a recognition target aspect ratio, a landscape recognition target area ratio, a portrait recognition target area ratio, an input image size, a recognition target image size, and coordinate values minX, maxX, minY, and maxY which are used by the mobile application 302. Data managed by the DB unit 309 is stored in the storage unit 308. An example of an object information management table 701 managed by the DB unit 309 is illustrated in FIG. 10.

The line segment detection unit 310 analyzes the camera input image and executes straight line detection. In the present example embodiment, although the Hough transformation method known as a feature extraction method for detecting a straight line from an edge point by coordinate transformation is used as a straight line detection method, another feature extraction method may be used. In other words, the line segment detection unit 310 executes line segment detection of the character plate 402 of the object 105 from the camera input image. However, as described above, depending on a light source condition or imaging capability of the camera unit 104, it is difficult to precisely detect the edges of four sides of the character plate 402 if a target object is a black character plate 402 provided on a black tire, and thus there is a case where the closed area indicating the plate area cannot be extracted.

An aspect ratio calculation unit 311 analyzes the camera input image and calculates aspect ratios and coordinates of the character plate 402 and a character string on the character plate 402.

An area determination unit 312 determines whether a character string of the character plate 402 is included in the camera input image based on the edge detection result of the character plate 402 and the object detection result of the object detection unit 314.

An edge calculation unit 313 executes processing for calculating an edge amount of the camera input image. The edge calculation unit 313 calculates the edge amount in the recognition target area determined by the area determination unit 312. The edge calculation unit 313 evaluates the image based on the edge amount in the recognition target area. In the present example embodiment, the edge calculation unit 313 calculates edge intensity in each pixel based on luminance of the image acquired from the camera unit 104 and calculates the edge amount in the recognition target area from the edge intensity of each pixel. However, another image component may be used instead of luminance. The edge intensity refers to intensity of the edge calculated for each pixel of the captured image. In the present example embodiment, a method for acquiring a total of absolute values of first derivations by calculating the first derivations of the pixels adjacent in the x-direction and the y-direction will be used as an extraction method of the edge intensity. Through the above-described method, higher edge intensity can be acquired when a difference in luminance values between the adjacent pixels becomes greater. However, another edge extraction method may be also used if the edge amounts described below can be compared to each other. For example, an edge intensity of each pixel in the captured image can be acquired by using the Sobel filter method. In the Sobel filter method, a contour is detected by calculating a first derivation of an image space. Further, the edge amount is calculated based on the edge intensity in a specific area (recognition target area) of the captured image. The edge amount may be a sum or an average value of edge intensities of the pixels in an object area. Other methods may also be used for calculating the edge amount as long as comparable values can be calculated.

The object detection unit 314 detects an object on the character plate 402 when the area determination unit 312 judges that the four sides (i.e., closed area) of the character plate 402 cannot be detected because the line segment detection unit 310 cannot execute line segment detection. In the present example embodiment, the object refers to a numeral or a character. In recognition processing of the object, the information acquired from partial image data is compared with dictionary data and a recognition target object is identified based on the comparison result.

Subsequently, various captured images (camera input images) will be described with reference to the examples illustrated in FIGS. 5 to 8. The mobile application 302 executes processing for detecting the character plate 402 from the captured image. However, a position of the character plate 402 cannot be completely identified if a closed area consisting of straight lines of edges cannot be detected.

Figure 5:
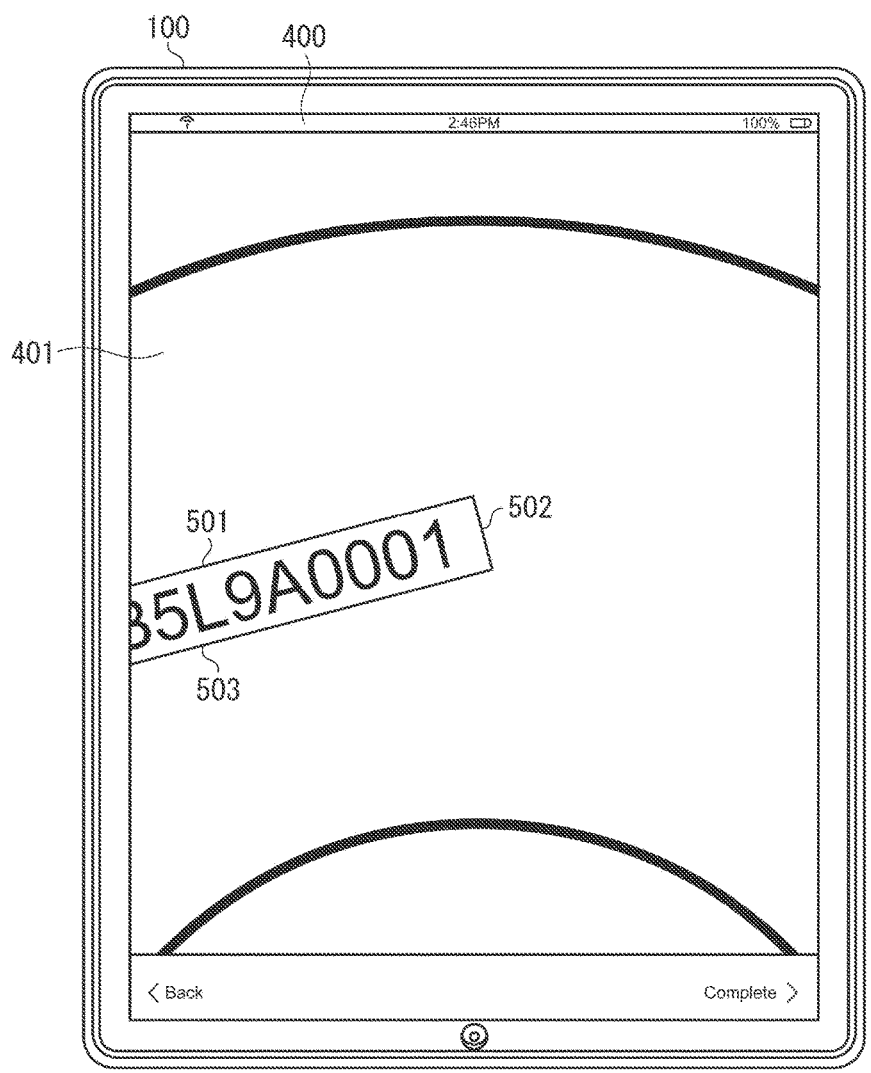
FIG. 5 is a diagram illustrating an example of a camera input image.

In the example of the camera input image in FIG. 5, a left edge and a part of a character of the character plate 402 are cut off (i.e., an image without a left edge and with a cutoff character). In the image in FIG. 5, although an upper edge 501, a right edge 502, and a lower edge 503 of the character plate 402 of the tire are detected by the image analysis unit 306 and the line segment detection unit 310, but a left edge is not included in the captured image, so that a closed area consisting of four sides cannot be detected. Accordingly, a position of the character plate 402 cannot be determined only from the edges. At this time, with respect to the image in FIG. 5, detection processing of a character string object is executed by the object detection unit 314. The object detection unit 314 refers to an object information management table 701 in FIG. 10 (details will be described below), and determines whether a detected object is the characters of the character plate 402 to be processed. By referring to the object information management table 701, the object is determined as a character plate 1 based on a condition that an object type 725 is a character string and an object format 726 is expressed as a regular expression ([A-Z]\d){2} [A-Z]\d{4}. The regular expression of the object format 726 indicates types and an arrangement order of the characters used for the object. In this example, the regular expression of the character plate 1 makes it a condition that the first, the third, and the fifth characters from the left are alphabets of A to Z, whereas the second, the fourth, and the sixth to ninth characters from the left are numerals of 0 to 9. In the example of FIG. 5, because the first character "B" from the left cannot be recognized, the object detection unit 314 determines that the object is not a character string object of the character plate 1.

Figure 6:
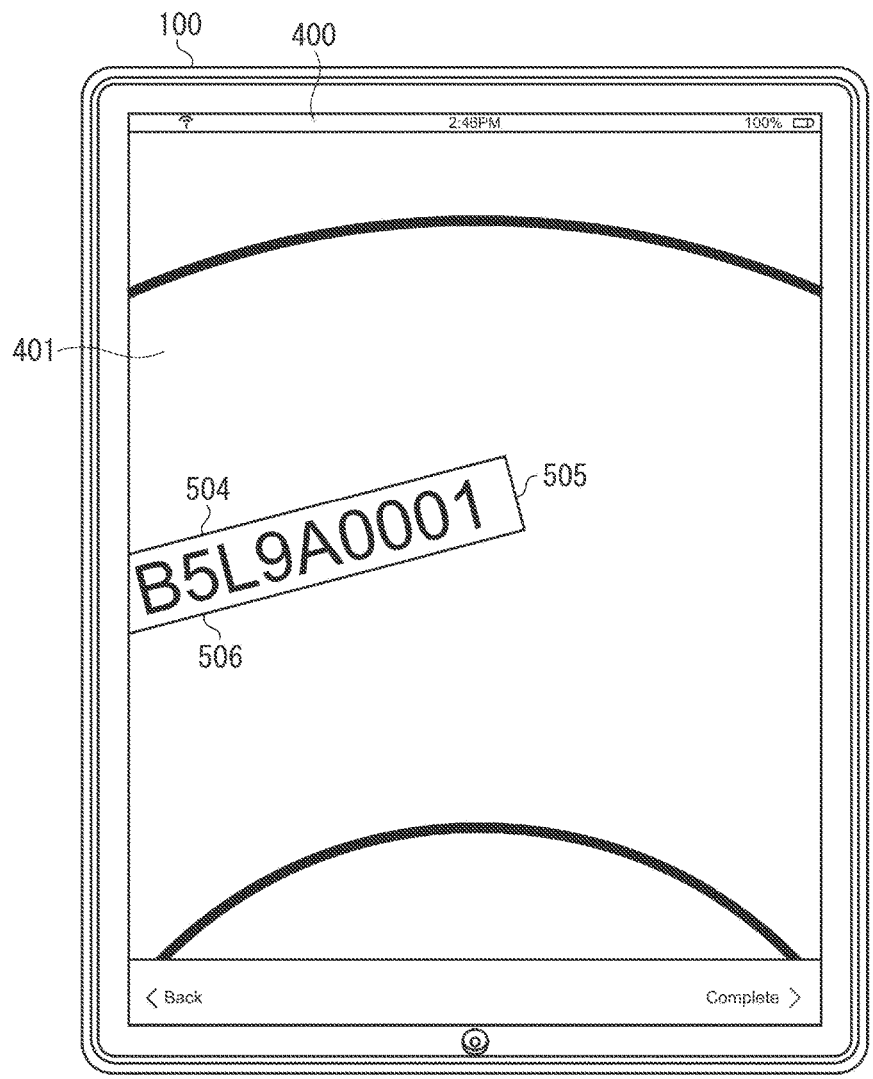
FIG. 6 is a diagram illustrating an example of a camera input image.

In the example of the camera input image in FIG. 6, an image of a character portion is captured while a left edge of the character plate 402 is cut off (i.e., an image without a left edge and with a character which is not cut off). In the image in FIG. 6, although an upper edge 504, a right edge 505, and a lower edge 506 of the character plate 402 of the tire are detected by the image analysis unit 306 and the line segment detection unit 310, a closed area consisting of four sides cannot be detected because a left edge is not included in the captured image. Accordingly, a position of the character plate 402 cannot be determined only from the edges. At this time, detection processing of a character string object is executed by the object detection unit 314.

The object detection unit 314 detects a character string "B5L9A0001" on the character plate 402 and judges whether the detected character string satisfies a determination condition of the character plate 1 described in the object information management table 701. As a result, the object detection unit 314 judges that the object type 725 is a character string and the detected character string satisfies a condition indicated by the regular expression ([A-Z]\d){2} [A-Z]\d{4} of the object format 726. Accordingly, the object detection unit 314 determines that the object is detected.

Figure 7:
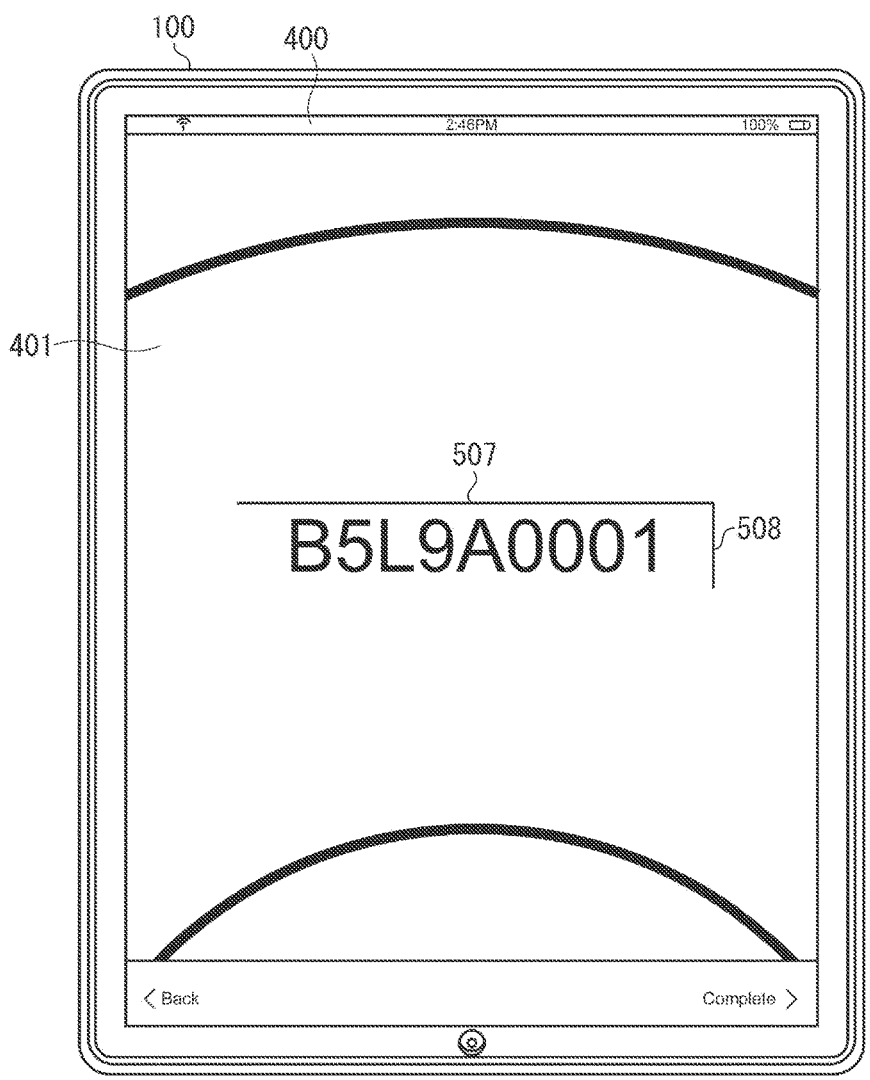
FIG. 7 is a diagram illustrating an example of a camera input image.

FIG. 7 is a diagram illustrating an example of an image in which a left edge and a lower edge of a character plate cannot be detected. In the image in FIG. 7, although an upper edge 507 and a right edge 508 of the character plate 402 of the tire are detected by the image analysis unit 306 and the line segment detection unit 310, a closed area consisting of four sides cannot be detected because a left edge and a lower edge cannot be detected. However, the edge aspect ratio of the character plate 402 in the object information management table 701 is calculated by the aspect ratio calculation unit 311, so that the character plate 402 can be detected from this example image.

The aspect ratio calculation unit 311 compares the aspect ratio determined by the upper edge 507 and the right edge 508 with the recognition target aspect ratio 704 in the object information management table 701 to detect a character plate when a closed area (four sides) cannot be detected. Specifically, two sides, that is, the upper edge 507 and the right edge 508 are detected respectively as a landscape edge and a portrait edge. These two sides may fall into either of the following cases: (1) both sides are detected from one end to the other end of the plate, (2) one side is detected from one end to the other end of the plate whereas on another side, only a part of the plate is detected, or (3) on both sides, only a part of the plate are detected, i.e., on both sides, the character plate from one end to the other end is not detected.

If the two sides fall into the case 1, the character plate 402 can be acquired correctly because a ratio between the length of the upper edge 507 and the length of the right edge 508 approximately coincides with the recognition target aspect ratio 704 of the object information management table 701, so that the aspect ratio calculation unit 311 determines that an image from which the character string can be detected is acquired.

If the two sides fall into the case 2, the aspect ratio calculation unit 311 determines whether the entire character string of the character plate 402 is included in the image by using the upper edge 507 as a landscape edge and the right edge 508 as a portrait edge. Specifically, in a case where the upper edge 507 from one end to the other end of the plate is not acquired (i.e., a length in the landscape direction is shorter than the actual length while the right edge 508 in the portrait direction is detected from one end to the other end of the plate), the aspect ratio calculation unit 311 determines that the entire character string of the character plate 402 is included in the image if a ratio of the length of the upper edge 507 in the landscape direction to the length of the right edge 508 in the portrait direction (landscape edge length/portrait edge length) is greater than the landscape recognition target area ratio 705 of the object information management table 701 (in the case of the character plate 1, "5.84/1=5.84"). Further, in a case where the right edge 508 from one end to the other end of the plate is not acquired (i.e., a length in the portrait direction is shorter than the actual length while the upper edge 507 in the landscape direction is detected from one end to the other end of the plate), the aspect ratio calculation unit 311 determines that the entire character string of the character plate 402 is included in the image if a ratio of the length of the right edge 508 in the portrait direction to the length of the upper edge 507 in the landscape direction (portrait edge length/landscape edge length) is greater than the portrait recognition target area ratio 706 (in the case of the character plate 1, "0.917/6=0.153").

If the two sides fall into the case 3, the ratio between the two sides does not coincide with any of the conditions of the cases 1 and 2, so that the aspect ratio calculation unit 311 determines that the character plate 402 cannot be correctly detected. In addition, there is a case where the ratio between the lengths of the upper edge 507 and the right edge 508 incidentally coincides with the condition of the cases 1 or case 2 even though on both sides, the plate from one end to the other end is not detected. In this case, although the aspect ratio calculation unit 311 determines that the character string of the character plate 402 is included in the image, a correct character string cannot be acquired in the OCR processing or the object (character string) detection processing executed subsequently, so that it will be found that the above determination is not correct. In such a case, the user is instructed to capture an image again.

Figure 8:
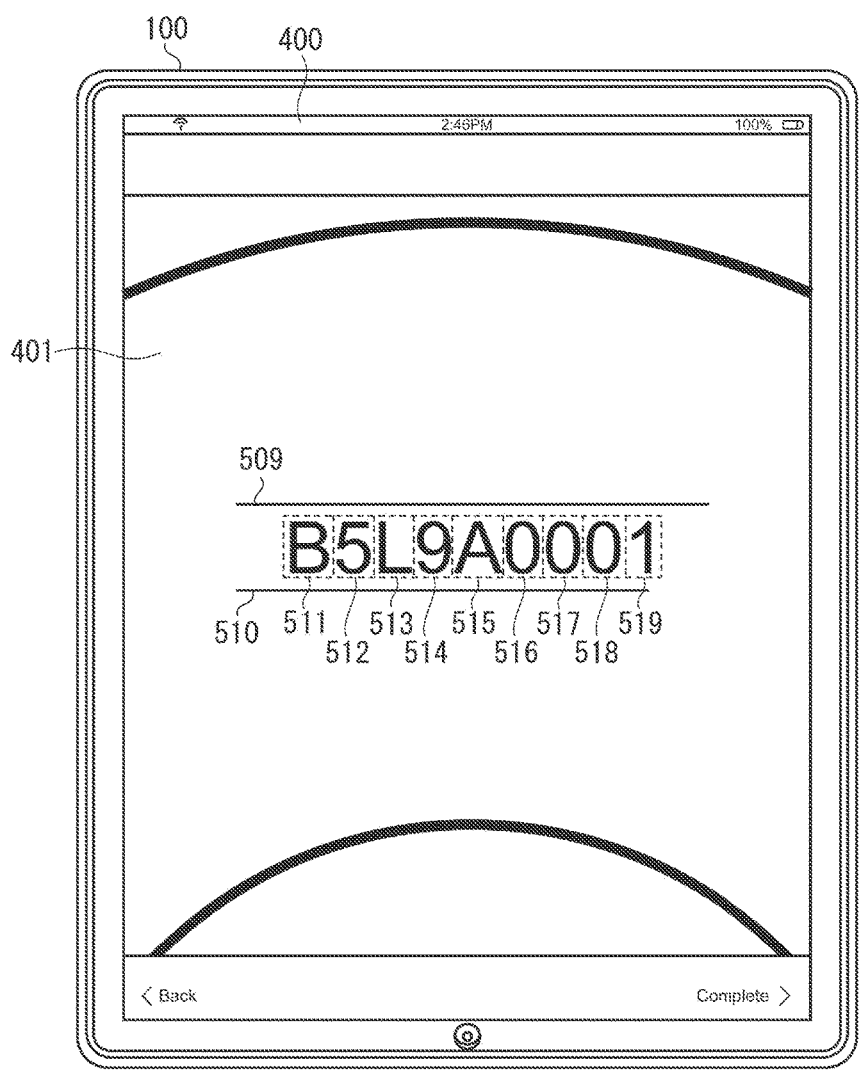
FIG. 8 is a diagram illustrating an example of a camera input image.

FIG. 8 is a diagram illustrating an example of an image in which a left edge and a right edge of the character plate 402 cannot be detected. In the image in FIG. 8, an upper edge 509 and a lower edge 510 of the character plate 402 of the tire are detected by the image analysis unit 306 and the line segment detection unit 310. However, a closed area consisting of four sides cannot be detected because a left edge and a right edge cannot be detected. Accordingly, a position of the character plate 402 cannot be determined only by checking the edges. At this time, detection processing of the character string object 511-519 is executed by the object detection unit 314. The object detection unit 314 detects a character string "B5L9A0001" on the character plate 402 and judges whether the detected character string satisfies a determination condition as the character plate 1 described in the object information management table 701. As a result, the object detection unit 314 judges that the object type 725 is a character string and the detected character string satisfies also a condition indicated by the regular expression ([A-Z]\d){2}[A-Z]\d{4} of the object format 726. Accordingly, the object detection unit 314 determines that the object is detected.

<Processing Flow of Mobile Terminal 100>

Figure 9:
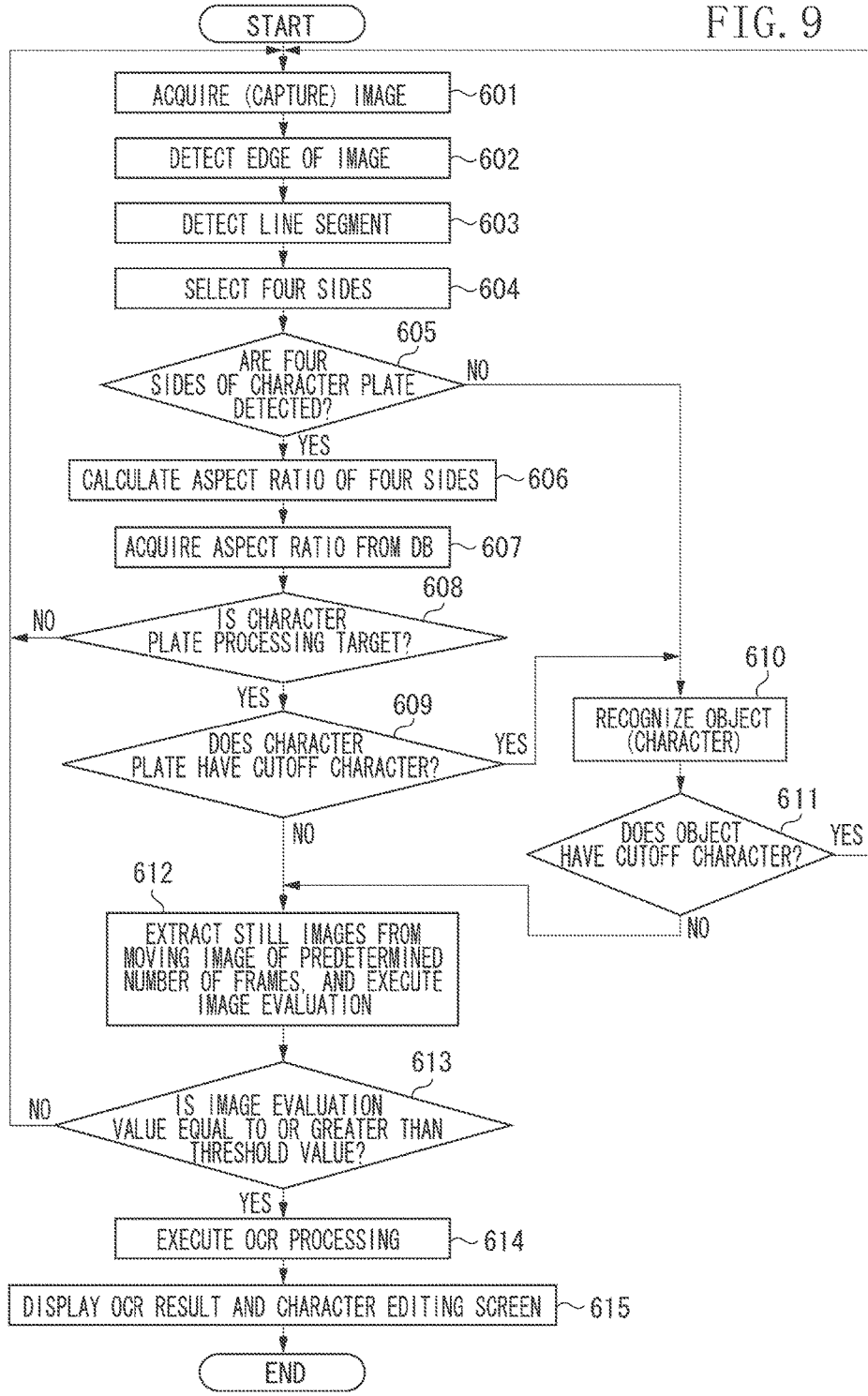
FIG. 9 is a flowchart illustrating a processing flow.

Processing executed by the mobile terminal 100 will be described with reference to the flowchart in FIG. 9. The mobile application 302 of the mobile terminal 100 starts the processing flow when an image of the object 105 is acquired via the camera unit 104 as a trigger.

In the present example embodiment, when a target object image is captured by the mobile terminal 100, the mobile terminal 100 automatically captures the image after determining whether a character string of a character plate is included in the image, so that an image including an appropriate recognition target area can be easily captured. Further, at this time, use of the character string object detection is reduced as much as possible if the above determination can be executed only with the edge detection of the character plate, so that the processing can be executed in a short time at low cost.

In step S601, the image analysis unit 306 acquires an image of the object 105 captured by the camera unit 104.

In step S602, the image analysis unit 306 executes edge detection of the image acquired in step S601. In the present example embodiment, although the Canny method is used as the edge detection method, another edge detection method may also be used.

In step S603, the line segment detection unit 310 executes straight line detection based on the edge information detected in step S602. In the present example embodiment, although the Hough transformation method is used as a straight line detection method, another feature extraction method may be used.

In step S604, the image analysis unit 306 selects four sides from the line segment information detected by the line segment detection unit 310 in step S603. The line segment detection unit 310 selects the straight lines that forms the four sides based on the coordinate information of the line segments. Each of the line segments is determined as a character plate left edge 713, a character plate upper edge 714, a character plate right edge 715, and a character plate lower edge 716 of the character plate 402. If a closed area is formed by the edge lines, the line segment detection unit 310 determines that the four sides are detected.

In step S605, the image analysis unit 306 analyzes the line segment information of the four sides selected in step S604 and determines whether four sides of the character plate 402 are detected. Further, the image analysis unit 306 may analyze the line segment information and determine that the four sides are detected in a case where two or more sides of the character plate 402 are detected and the closed area can be formed by complementing undetected edge line segments. When the image analysis unit 306 determines that the four sides of the character plate 402 is detected (YES in step S605), the processing proceeds to step S606. When the image analysis unit 306 determines that the four sides is not detected (NO in step S605), the processing proceeds to step S610.

In step S606, the aspect ratio calculation unit 311 analyzes the camera input image acquired through the camera unit 104, and calculates the aspect ratios and the coordinates of the character plate 402 and its character string.

In step S607, the aspect ratio calculation unit 311 acquires information about the aspect ratio from the object information management table 701 stored in the DB unit 309. FIG. 10 is a diagram illustrating an example of the object information management table 701. A recognition target aspect ratio 704, a landscape recognition target area ratio 705, and a portrait recognition target area ratio 706 corresponding to an id 702 of the previously-specified character plate are acquired from the object information management table 701 as the information about the aspect ratio. In addition, a list of classifications 703 may be displayed on the information display unit 304 of the mobile application 302 for the user to select and identify the id 702 of the character plate 402 of the object 105. Further, any method is used for identifying the id 702. For example, the id 702 may be automatically determined from a captured image or a position (e.g., global positioning system (GPS) information) of the object 105.

In step S608, based on the aspect ratio of the character plate 402 calculated in step S606 and the aspect ratio acquired in step S607, the image analysis unit 306 determines whether the captured character plate is a processing target. When the aspect ratio of the character plate 402 calculated in step S606 is distinctly different from the recognition target aspect ratio 704 acquired in step S607, the image analysis unit 306 determines that the character plate 402 is not a target of the OCR processing. In step S608, if the character plate 402 is determined as a non-processing target plate (NO in step S608), the processing returns to step S601 to capture the image again. On the other hand, in step S608, if the character plate 402 is determined as a processing target plate (YES in step S608), the processing proceeds to step S609.

In step S609, based on the aspect ratio calculated in step S606 and the information about the aspect ratio such as the landscape recognition target area ratio 705, the portrait recognition target area ratio 706, and an input image size 707 acquired in step S607, the image analysis unit 306 determines whether the character plate 402 has a character which is cut off. If the image analysis unit 306 determines that the character plate 402 has the cutoff character (YES in step S609), the processing proceeds to step S610. If the image analysis unit 306 determines that the character plate 402 does not have the cutoff character (NO in step S609), the processing proceeds to step S612.

In addition, the landscape recognition target area ratio 705 is used for determining the character cut-off in the landscape direction of the character plate 402. The landscape recognition target area ratio 705 is a value for the aspect ratio calculation unit 311 to determine the landscape ratio of each character plate 402. Specifically, the landscape recognition target area ratio 705 indicates a length of the edge in the landscape direction (i.e., the character plate upper edge 714 or the character plate lower edge 716) that prevents the character string from being cut off when a length of the edge in the portrait direction (i.e., the character plate right edge 715 or the character plate left edge 713) is taken as a reference. If the character plate 402 satisfies the above ratio, the image analysis unit 306 determines that the character plate 402 does not have the cutoff character in the landscape direction.

Further, the portrait recognition target area ratio 706 is used for determining the character cut-off in the portrait direction of the character plate 402. The portrait recognition target area ratio 706 is a value for the aspect ratio calculation unit 311 to determine the portrait ratio of each character plate 402. Specifically, the portrait recognition target area ratio 706 indicates a length of the edge in the portrait direction (i.e., the character plate right edge 715 or the character plate left edge 713) that prevents the character string from being cut off when a length of the edge in the landscape direction (i.e., the character plate upper edge 714 or the character plate lower edge 716) is taken as a reference. If the character plate 402 satisfies the above ratio, the image analysis unit 306 determines that the character plate 402 does not have the character cut-off in the portrait direction.

In step S610, the object detection unit 314 executes object recognition. In the present example embodiment, recognition processing of the object refers to a process of recognizing a recognition target object by comparing the information acquired from partial image data with dictionary data. The recognition method is not limited to the specific processing method as long as numerals and characters are recognized. In addition, cost for searching for the object can be reduced when an object recognition space is reduced. Thus, even if the closed area (four sides) of the character plate 402 cannot be detected, the area determination unit 312 can search for the object in a vicinity of the edge line segment detected by the line segment detection unit 310.

In step S611, based on a result of the object recognition in step S610, the object detection unit 314 determines whether the recognized character string object has the cutoff character. The object detection unit 314 acquires the object format 726 corresponding to the id 702 of the character plate 402 as the object 105 and determines whether a character string of the character plate 402 has the cutoff character. In the present example embodiment, information indicating the object type 725 as a character string and the object format 726 as a regular expression ([A-Z]\d){2}[A-Z]\d{4} is acquired with respect to the character plate 1. The object detection unit 314 makes a determination by comparing the information about the object format 726 with a type and a number of characters in the character string of the character plate 402 determined from the OCR result of the object. The object detection unit 314 determines that the character string object is detected when the format of the character string coincides with the object format 726.

In step S611, if the object detection unit 314 determines that the object has the cutoff character (YES in step 3611), the processing returns to step S601, and the image is captured again. On the other hand, in step S611, if the object detection unit 314 determines that the object does not have the cutoff character (NO in step S611), the processing proceeds to step S612.

In step S612, the edge calculation unit 313 extracts a plurality of still images from a moving image of a predetermined number of frames counted from a time point of the determination, and evaluates the respective images. An edge amount calculated based on the edge intensity is used for evaluating the images. The edge intensity refers to intensity of the edge calculated for each pixel in the captured image. In the present example embodiment, as an extraction method of the edge intensity, a method for acquiring a total of absolute values of calculated first derivations of pixels adjacent in the x-direction and the y-direction will be used. Through the above-described method, higher edge intensity can be acquired if a difference in luminance values between the adjacent pixels becomes greater. Further, the edge amount is calculated based on the edge intensity within a specific area (recognition target area) of the captured image. The edge amount may be a sum or may be an average value of the edge intensities of the pixels in an object area. Another method may be also used for calculating the edge amount as long as comparable values can be calculated.

In step S613, the image analysis unit 306 determines whether the image evaluation value (edge amount) calculated in step S612 is equal to or greater than a threshold value defined previously. In step S613, if the image analysis unit 306 determines that the image evaluation value is less than the threshold value (NO in step S613), the processing returns to step S601, and the image is captured again. In step 3613, if the image analysis unit 306 determines that the image evaluation value is equal to or greater than the threshold value (YES in step S613), the processing proceeds to step S614.

In step S614, the OCR unit 307 executes character recognition processing (OCR processing) on a character with respect to a still image having the highest image evaluation value and acquires character string information from that still image.

In step S615, the information display unit 304 displays the OCR result and a character editing screen for editing the OCR result. Examples of the OCR result and the character editing screen UI are illustrated in FIG. 11.

Figure 11:
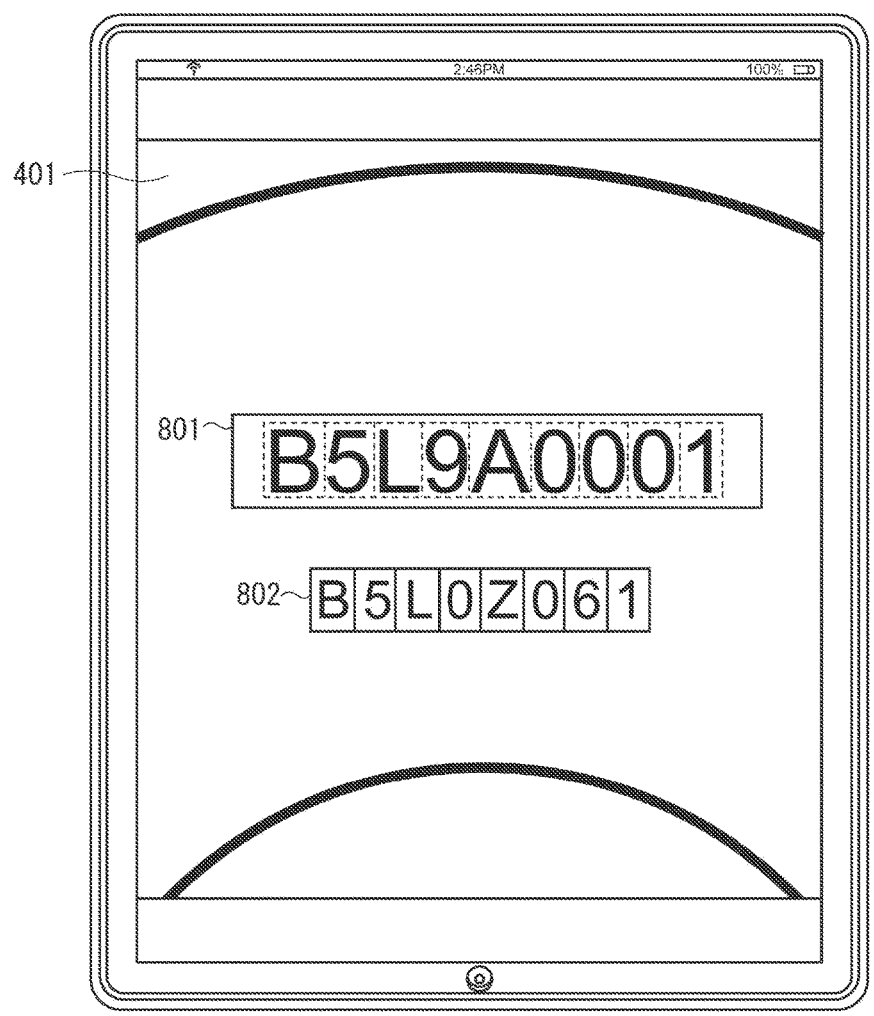
FIG. 11 is a diagram illustrating an example of the UI which displays a result of optical character recognition (OCR).

In FIG. 11, the information display unit 304 identifies and displays the area determined as the character string of the character plate 402 in the camera input image, in an area 801. Further, the OCR result of that character string is displayed in an area 802.

As described above, according to the present example embodiment, even when an image of the object from which a character plate cannot be detected easily is to be captured by the mobile terminal, an image including an appropriate recognition target area without a cutoff character can be captured.

FIG. 10 is a diagram illustrating an example of the object information management table 701 stored in the DB unit 309. The object information management table 701 stores determination information 721-723 of each character plate. A value of the object information management table 701 may be automatically generated by the image analysis unit 306 from a sample character plate captured previously, or may be manually input by the user for each character plate. However, in the present example embodiment, an input method is not limited to any type.

The id 702 is an ID for the mobile application 302 to uniquely identify a character plate. The classification 703 is information for the user to recognize the character plate. The recognition target aspect ratio 704 is a value for the aspect ratio calculation unit 311 to determine the aspect ratio of each character plate 402. The landscape recognition target area ratio 705 is a value for the aspect ratio calculation unit 311 to determine the landscape ratio of each character plate 402. Specifically, the landscape recognition target area ratio 705 indicates a length of the edge in the landscape direction (i.e., the character plate upper edge 714 or the character plate lower edge 716) that prevents the character string from being cut off when a length of the edge in the portrait direction (i.e., the character plate right edge 715 or the character plate left edge 713) is taken as a reference. The portrait recognition target area ratio 706 is a value for the aspect ratio calculation unit 311 to determine the portrait ratio of the character plate 402. Specifically, the portrait recognition target area ratio 706 indicates a length of the edge in the portrait direction (i.e., the character plate right edge 715 or the character plate left edge 713) that prevents the character string from being cut off when a length of the edge in the landscape direction (i.e., the character plate upper edge 714 or the character plate lower edge 716) is taken as a reference. The input image size 707 indicates a size of the image output by the camera unit 104 which can be acquired by the mobile application 302. The recognition target image size 708 indicates a size of the character plate 402 in the image acquired by the mobile application 302. Although the actual image size of the acquired character plate 402 may be larger or smaller than the recognition target image size 708, the image analysis unit 306 normalizes the image size to the indicated size. Further, if an image is deformed because of the imaging condition, the image analysis unit 306 normalizes the image into the indicated size by executing keystone correction. A minX 709 indicates left end coordinates (object upper left 717, object lower left 720) of the object when the upper left coordinates of the character plate 402 is taken as a reference (0, 0). A maxX 710 indicates right end coordinates (object upper right 718, object lower right 719) of the object when the upper left coordinates of the character plate 402 is taken as a reference (0, 0). A minY 711 indicates upper end coordinates (object upper left 717, object upper right 718) of the object when the upper left coordinates of the character plate 402 is taken as a reference (0, 0). A maxY 712 indicates lower end coordinates (object lower right 719, object lower left 720) of the object when the upper left coordinates of the character plate 402 is taken as a reference (0, 0).

The object type 725 indicates a type of the object determined by the object detection unit 314. Specifically, a type of the character string or the image is included in the object type 725. Data information of each object type determined by the object detection unit 314 is included in the object format 726. Specifically, when the object type 725 is a character string, information indicating an arrangement order of character types is included in the object format 726. Further, when the object type 725 is an image, the object detection unit 314 determines whether an image coinciding with the registered image is detected through partial image recognition.

Other Embodiments

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more above-described embodiment and/or that includes one or more circuits (e.g., application specific integrated circuit (ASIC)) for performing the functions of one or more above-described embodiment, and by a method performed by the computer of the system or apparatus by, for example, reading out and executing the computer executable instructions from the storage medium to perform the functions of one or more above-described embodiment and/or controlling the one or more circuits to perform the functions of one or more above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to various examples of embodiments, it is to be understood that the invention is not limited to the disclosed examples of embodiments. The scope of the following claims is to be accorded the broadest interpretation so as to encompass all such modifications and equivalent structures and functions.

This application claims the benefit of Japanese Patent Application No. 2016-045471, filed Mar. 9, 2016, which is hereby incorporated by reference herein in its entirety.

What is claimed is:

1. An information processing apparatus comprising:
a memory that stores a program of instructions; and
at least one processor in communication with the memory, wherein by executing the program of instructions, the at least one processor performs:
detecting a line segment from an image;
determining whether four sides of a character plate that contains characters are detected based on the detected line segment;
calculating an aspect ratio of the detected four sides in a case where it is determined that four sides of the character plate are detected;
determining whether the calculated aspect ratio satisfies a first condition;
in a case where it is determined that four sides of the character plate are not detected, searching a vicinity of the detected line segment for a character string object, and determining whether the character string object satisfies a second condition; and
judging that a recognition target area is included in the image in a case where it is determined that the aspect ratio satisfies the first condition or it is determined that the character string object satisfies the second condition.

2. The information processing apparatus according to claim 1, wherein by executing the program of instructions, the at least one processor further performs:
in a case where it is determined that the recognition target area is included in the image, extracting a plurality of still images based on a moving image of a predetermined number of frames, and calculating an edge amount of the recognition target area in each still image; and
executing character recognition processing on a still image the calculated edge amount of which is equal to or greater than a threshold value.

3. A non-transitory computer-readable storage medium storing a computer program that when executed by a computer causes the computer to perform:
detecting a line segment from an image;
determining whether four sides of a character plate that contains characters are detected based on the detected line segment;
calculating an aspect ratio of the detected four sides in a case where it is determined that four sides of the character plate are detected;
determining whether the calculated aspect ratio satisfies a first condition;
in a case where it is determined that four sides of the character plate are not detected, searching a vicinity of the detected line segment for a character string object, and determining whether the character string object satisfies a second condition; and
judging that a recognition target area is included in the image in a case where it is determined that the aspect ratio satisfies the first condition or it is determined that the character string object satisfies the second condition.

4. A non-transitory computer-readable storage medium according to claim 3, wherein when executed by the computer the computer program further causes the computer to perform:
in a case where it is determined that the recognition target area is included in the image, extracting a plurality of still images based on a moving image of a predetermined number of frames, and calculating an edge amount of the recognition target area in each still image; and
executing character recognition processing on a still image the calculated edge amount of which is equal to or greater than a threshold value.

5. An information processing method executed by an information processing apparatus, the information processing method comprising:
detecting a line segment from an image;
determining whether four sides of a character plate that contains characters are detected based on the detected line segment;
calculating an aspect ratio of the detected four sides in a case where it is determined that four sides of the character plate are detected;
determining whether the calculated aspect ratio satisfies a first condition;
in a case where it is determined that four sides of the character plate are not detected, searching a vicinity of the detected line segment for a character string object, and determining whether the character string object satisfies a second condition; and
judging that a recognition target area is included in the image in a case where it is determined that the aspect ratio satisfies the first condition or it is determined that the character string object satisfies the second condition.

6. The information processing method according to claim 5, wherein the information processing method further comprises:
in a case where it is determined that the recognition target area is included in the image, extracting a plurality of still images based on a moving image of a predetermined number of frames, and calculating an edge amount of the recognition target area in each still image; and
executing character recognition processing on a still image the calculated edge amount of which is equal to or greater than a threshold value.

* * * * *